United States Patent Office 3,532,952
Patented Oct. 6, 1970

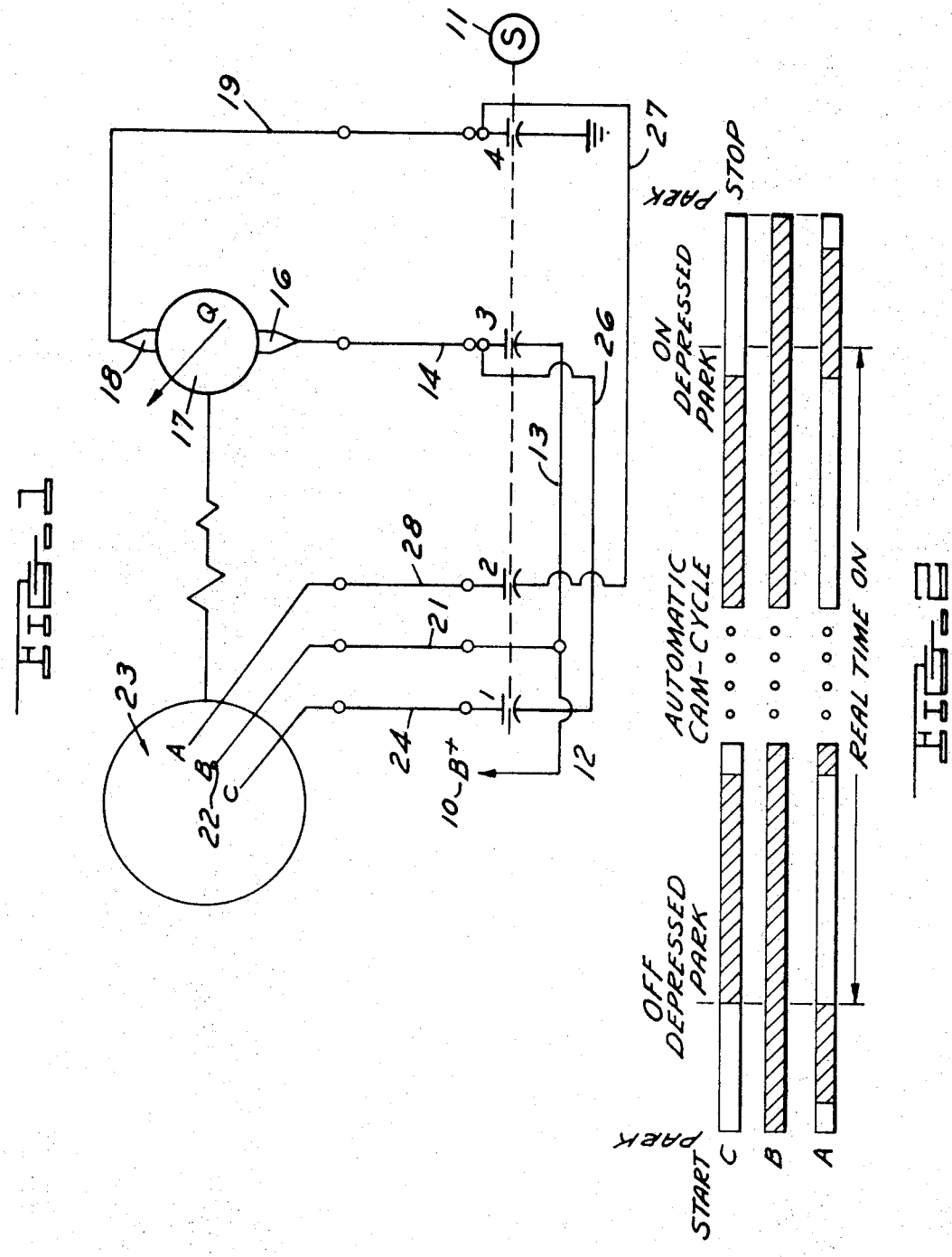

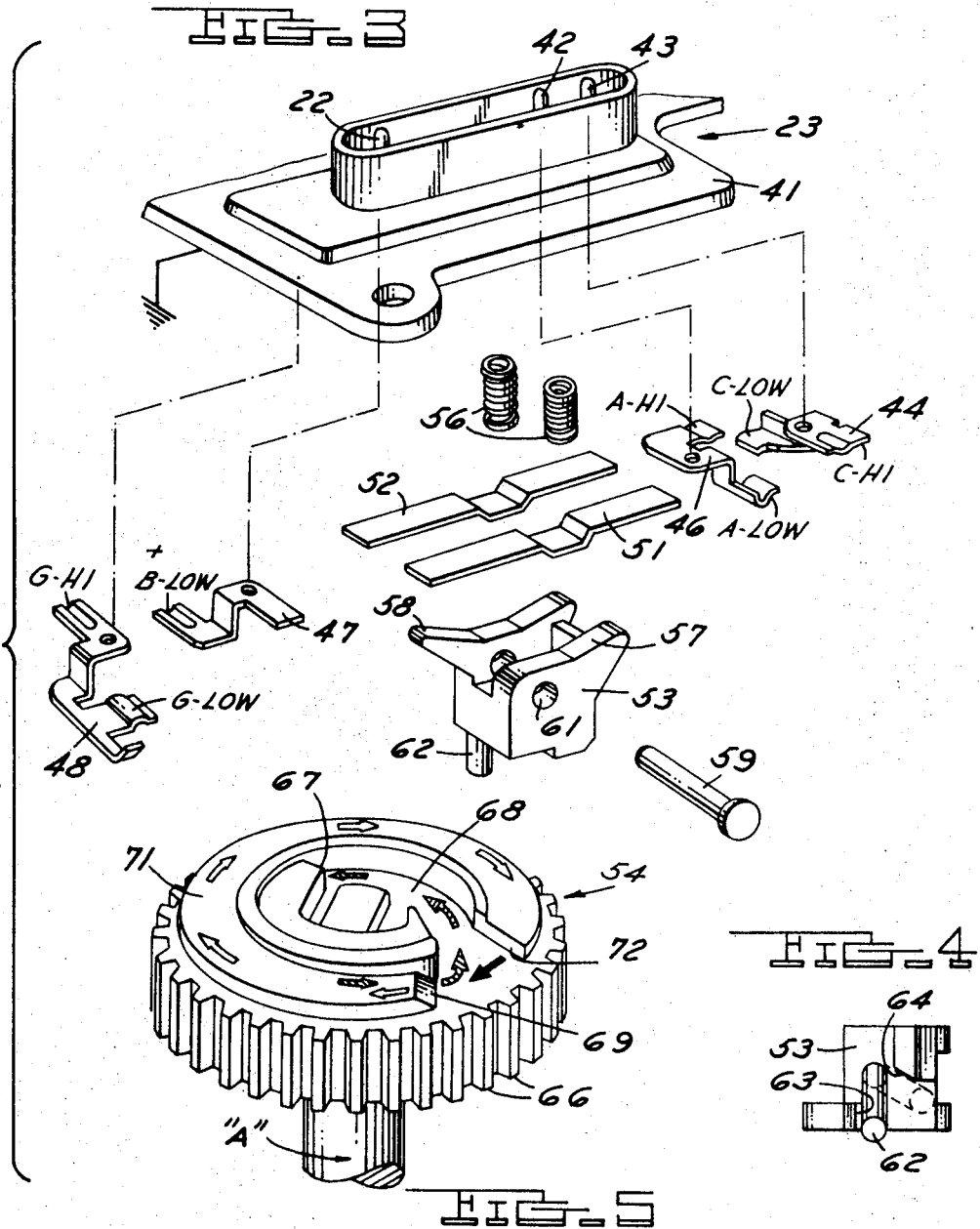

3,532,952
WINDSHIELD WIPER CONTROL CIRCUIT UTILIZING AN INTERNAL SWITCHING MECHANISM TO REVERSE AND DYNAMICALLY BRAKE THE MOTOR FOR PARKING THE WIPERS
Eugene C. Cagnon, Detroit, Kenneth P. Hurlin, Farmington, and Anthony S. Ryff, St. Clair Shores, Mich., assignors to Ford Motor Company, Dearborn, Mich., a corporation of Delaware
Filed June 6, 1968, Ser. No. 735,135
Int. Cl. H02p 3/10, 3/12
U.S. Cl. 318—466                              5 Claims

ABSTRACT OF THE DISCLOSURE

A windshield wiper system includes a power supply for supplying electrical energy to a motor which operates the wiper system from a park position to a wipe cycle. An alternate source of power, having two output circuits on which power or ground signals are supplied, is interconnected with the power supply and the motor by an actuating switch and interconnecting circuitry. When the actuating switch is in one condition, the power supply operates the wiper motor. When the switch is in the other condition, the source of power operates the wiper motor. The signal on the two output circuits of the source of power is interchanged near the end of each wipe cycle and if the source of power is connected to the wiper motor when the interchange occurs, the wiper system is returned from the wipe cycle to the park position.

BACKGROUND OF THE INVENTION

In the windshield wiper system utilized in conjunction with present day motor vehicles, the wiper blades are actuated from a park position to a repeated wipe cycle. When the action of the wiper blades is terminated, the blades are returned from the wipe cycle to the park position. Many electrical control systems have been proposed for operating the wiper blades from the park position to the wipe cycle and for returning the wiper blades to that position after the wipe cycle has been completed.

The windshield wiper control system of this invention is unique in that the circuitry which effects the return of the wiper blades from the wipe cycle to the park position is not active in driving the windshield wiper system during the repeated wipe cycle. However, when the wiper system is to be returned from the wipe cycle to the park position, the wiper control system of this invention takes over the supply of electrical energy to the wiper motor and allows the wiper blades to complete the wipe cycle they are in. At a terminal position of this wipe cycle, the control system reverses the current supplied to the wiper motor and the blades are returned to a park position.

The wiper control system of this invention is unique in that it does not play an active role in normal operation of the wiper system. This substantially reduces the wear rate and failure occurrences of the control system. The control system is also unique in that it plays a direct role in supplying current to the wiper system to complete the wipe cycle and thereafter reverse the current to the wiper motor to return the system to a park condition.

SUMMARY OF THE INVENTION

This invention relates to a windshield wiper control system and, more particularly, to an improvement in a windshield wiper system of the type having a drive mechanism operated by a motor driven from a power supply wherein the supply of electrical energy to the motor operates the wiper system from a park position to a wipe cycle.

In particular, the improvement in the wiper system includes a source of power in addition to and separate from the power supply which is normally associated with the windshield wiper motor. The source of power has two output circuits and supplies on the circuits either a power signal or a ground signal, a power signal normally being applied to one circuit and a ground signal to the other circuit during the wipe cycle. An additional element of the control system is provided for interchanging the output circuits of the source of power upon which the power and ground signals are supplied for a small interval near the end of each wipe cycle of the wiper system. An actuating switch and interconnecting circuitry electrically interconnect the power supply, the motor and the source of power. The switch is operable from a first condition wherein the output circuits of the source of power are connected and the power supply is disconnected from the motor to a second condition wherein the output circuits of the source of power are disconnected and the power supply is connected to the motor. When the switch is actuated from the first condition to the second condition, the power supply is connected to the motor and drives the motor in a predetermined direction to operate the drive mechanism to move the wiper system from the park position into the wipe cycle. The wipe cycle continues until the switch is actuated from its second condition to its first condition at which time the output circuits of the source of power are connected to the motor to continue driving the motor in the predetermined direction to finish the particular wipe cycle the wiper blades are on. Near the end of the particular wipe cycle, the output circuits upon which the signals of the source of power are supplied are interchanged and this interchange causes a reversal in direction of rotation of the wiper motor. Reversing of the motor returns the wiper system from the wipe cycle to the park position.

Thus, the wiper control system of this invention provides a source of power which is brought into operative association with the wiper motor only at such times as it is desired to return the wiper system from a repeating wipe cycle to a park position. The source of power connected to the motor reverses the direction of the power supplied to the wiper motor near the end of the wipe cycle on which the source is brought into association with the wiper motor. Such action of reversal brings the wiper system to a park position from the wipe cycle.

BRIEF DESCRIPTION OF THE DRAWINGS

FIG. 1 is a schematic circuit diagram of the windshield wiper control system of this invention. FIG. 2 is a graphical illustration of the electrical outputs of the source of power shown in the circuit of FIG. 1. FIG. 3 is an isometric view of a structure suitable for use as the source of power to develop the electrical outputs shown in FIG. 2. FIG. 4 is a view showing details of one element of the structure shown in FIG. 3. FIG. 5 is a schematic representation of the operation of the structure shown in FIG. 3 so as to develop the various electrical outputs shown in FIG. 2.

DESCRIPTION OF THE PREFERRED EMBODIMENT

In FIG. 1 there is schematically shown the windshield wiper control circuit of this invention. In the diagram a power supply B+, such as a 12 volt battery, is designated at 10. A switch 11 has associated therewith contacts 1, 2, 3 and 4. When the switch 11 is in a first condition, associated with the windshield wiper system in a park position, the contacts 1 and 2 are closed while contacts 3 and 4 are open. When the switch 11 is moved to a second condition, associated with the actuation and operation of the windshield wiper system, the contacts 1 and 2 are open and contacts 3 and 4 are closed to permit operation of the wiper system from a park position to a normal wipe cycle.

In this particular portion of the description of the control circuit of this invention, electrical outputs on the circuits designated as circuits A, B and C will be described as occurring in a particular sequence and no explanation of how that sequence is obtained will be given. A subsequent portion of this specification will describe the manner in which the signals are obtained on the circuits A, B and C.

Movement of the switch 11 to its "on" position or second condition to actuate the windshield wiper system from a park position to a wipe cycle results in contacts 1 and 2 being opened and contacts 3 and 4 being closed. When contact 3 is closed and power supply 10 is connected by leads 12, 13, closed contact 3, lead 14 and brush 16 to the motor 17 and thence by brush 18, lead 19 and closed contact 4 to ground. The flow of electrical energy through the motor 17 causes movement of the windshield wiper system initially from a park position to the normal wipe cycle and then constant repetition of the wipe cycle.

On the left-hand upper portion of FIG. 1 the three output circuits are identified as circuits A, B and C. In FIG. 2 the schematic diagram shows the particular signal developed on each of the circuits A, B and C during various portions of the cycle of operation of the windshield wiper system. When the windshield wiper system is in a park position, as indicated at the extreme left-hand portion of FIG. 2, circuits A and C have a ground signal thereon, represented as blank bar, and circuit B has a power signal thereon, represented by the shaded bar.

Operation of the switch 11 from its first condition to its second condition or "on" position maintains the power signal on the B circuit during movement of the wiper system from the park position to the "real time on" condition or repeated wipe cycle. Also, up to the start of the "real time on" of the wipe cycle, a ground signal is maintained on the C circuit and the ground signal on circuit A is changed to a power signal. When the system starts on a wipe cycle, at the beginning of the "real time on" condition, the power signal remains on the B circuit during each of the individual wipe cycles whereas the C circuit will have a power signal and the A circuit will have a ground signal thereon over the major portion of the time of each individual wipe cycle. In FIG. 2, two wipe cycles are designated on the left-hand and right-hand sides of the drawing. At the very end of each wipe cycle, the signals on the output circuits C and A are interchanged so that a power signal appears on circuit A while a ground signal appears on circuit C.

With this operation of circuits A, B and C in mind, when it is desired to return the wiper system from a normal wipe cycle to a park position, the switch 11 is returned from its second condition to its first condition or "off" position. This action closes contacts 1 and 2 and opens contacts 3 and 4 of the switch. Switch 11 is normally returned to the "off" position during an intermediate portion of the wipe cycle when a power signal is appearing on the C circuit and a ground signal is appearing on the A circuit. The power supply 10 is connected by the lead 12 and a lead 21 to a terminal 22 which is the terminal for the B circuit. The selective interconnection of the B circuit and a ground circuit with the A and C circuits, by apparatus to be described subsequently, forms the independent source of power, generally designated by the numeral 23, for the motor 17 when the power supply 10 is disconnected directly therefom by operation of the switch 11 to its off or first condition.

Upon movement of the switch 11 to the off or first condition, a power circuit is established to the motor 17 from the source of power 23 by circuit C to a lead 24, the now closed contact 1, leads 26 and 14, the brush 16, across the windings of the motor 17 to the brush 18, the lead 19, a lead 27, the now closed contact 2, a lead 28 and the circuit A which has a ground signal thereon. Near the end of the wipe cycle, the signals on the A and C circuits are interchanged and a reversal in the direction of rotation of the motor 17 is affected if the switch 11 is in its off condition. The reversal of the motor 17 returns the wiper system driven thereby to the park position as is represented on the right-hand side of FIG. 2. In returning to the park position, the circuits A and C both have a ground signal applied thereon with the result that a ground signal is applied on both the brushes 16 and 18 of the motor 17 whereby the motor is dynamically braked to bring the same to rest when the wiper system is in a park position.

Apparatus for developing output signals

The selective application of a power and a ground signal from circuit B to the circuits A and C, as graphically illustrated in FIG. 2, may be obtained by apparatus such as shown schematically in FIG. 3.

In FIG. 3 the source of power 23, generally in the form of an electrical switch, includes a cover 41 having three terminals extending therethrough. A first terminal is the power terminal 22 for the circuit B. A second terminal 42 is the circuit A output terminal and a third terminal 43 is the circuit C output terminal. The C terminal 43 is connected to a C contact member 44 which has upper and lower terminals, respectively, designated as C Hi and C Low. The A terminal 42 likewise has an A contact member 46 which has upper and lower terminals, respectively, designated as A Hi and A Low. The B power terminal 22 has a B contact member 47 which has only a B Low terminal thereon. A ground contact member 48 is also connected to the cover 41 and electrically connected to a source of ground potential 49. The ground contact member 48 has upper and lower terminals, respectively, designated as G Hi and G Low terminals. A pair of conductive members 51 and 52 are utilized to interconnect the power and ground contact members 47 and 48, respectively, with the A and C contact members 46 and 44 so that the various signals are applied to the A and C terminals as desired in the sequence of operation of the windshield wiper system.

Also illustrated in FIG. 3 is a pivotable element 53, which in conjunction with a camming element 54, operates the source of power 23 in such a manner that the various combinations of powder and ground signals are applied to the A and C circuits. When assembling the source of power 23, a pair of springs 56 are interposed between the cover 41 and respective ones of the conductive members 51 and 52. Actuating surfaces 57 and 58 of the pivotable element 53 are brought into engagement, respectively, with the conductive members 51 and 52 and a pin 59 is inserted through openings in a pair of depending legs (not shown) of the cover 41 and through the opening 61 in the element 53 in order to secure the member 53 in operative association with the cover. The various contact members 44, 46, 47 and 48 are secured to the cover by conductive rivets.

The pivotable element 53 has associated therewith and depending from the bottom portion thereof a cam track following element 62. The element 62, as best seen in FIG. 4, is pivotable from a position where it engages a stop surface 63 to a position wherein it engages a second stop surface 64. The cam track following element 62 is operated by the camming element 54 during the cycle of operation of the windshield wiper system so that the power and ground signals are applied to the circuits A and C as discussed previously in conjunction with the operation of the control circuit of this invention.

The camming element 54 may be driven directly by the shaft of the motor 17 of the windshield wiper system so that the camming element is in synchronism with the motor during operation of the wiper system. In another driving arrangement, gear teeth 66 may be provided on the periphery of the camming element 54 so that the element may be independent of the motor shaft but, through a cooperating set of gears, may be driven in synchronism therewith.

The cam track following element 62 of the pivotable element 53 rides on the top surface of the camming element 54 where the arrows are shown in FIG. 3. More particularly, at the initiation of the wiper cycle, that is, when the windshield wiper system switch 11 is in an off or first condition, the element 62 is in engagement with a stop surface 67 of the element 54. The center line of the camming element 54, about which the element rotates, is offset to the left of the pivotable element 53 as viewed in FIG. 3. This offset causes the engagement of the stop surface 67 by the cam track following element 62 to result in the element 53 being pivoted to its first condition as is illustrated on the right side of FIG. 5.

In this first condition of the pivotable element 53 the actuating surface 57 of the element does not actuate conductive member 51 and, as a result, the conductive member 51 interconnects terminal G Low with terminal C Low whereby a ground signal is applied on the circuit C as is indicated in FIG. 2 at a park position. Likewise, in the first condition, the actuating surface 58 of the member 53 actuates the conductive member 52 to pivot it to such a condition that terminal G Hi is connected with terminal A Low whereby a ground signal is also applied to circuit A, which is also indicated in the FIG. 2. At this particular time the cam track following element 62 is pivoted into engagement with the stop surface 63 of the member 53.

When the switch 11 is thrown from the off or first condition to the on or second condition to actuate the windshield wiper motor 17 in the previously described manner, the windshield wiper motor operates the camming element 54 so that the same is rotated counterclockwise in the direction of arrow A of FIG. 3. Initial rotation of the camming element 54 brings the cam track following element 62 on the pivotable element 53 out of engagement with the stop surface 67 and along a cam track portion 68 of the element 54 to a camming ramp 69. During the travel of the element 62 along this particular cam track portion 68, the pivotable element 53 is in its second condition because sufficient clearance is permitted to allow the element 53 to assume an upright position.

In the second condition of the pivotable element 53, neither of the actuating surfaces 57 or 58 of the element are actuating their associated conductive members 51 or 52. Therefore, in the second condition, conductive member 51 interconnects G Low terminal with C Low terminal whereby a ground signal is applied on the C circuit. Conductive member 52 interconnects B Low terminal with A Low terminal whereby a power signal is applied on the circuit A. This is depicted in FIG. 2 just after operation or start of the wiper system up until the point at which a "real time on" condition is achieved. During this initial movement, the wiper blades of the system may be moved from a park position to a position whereat the wipe cycle will commence.

Further rotation of the camming element 54 in a counterclockwise direction, as viewed in FIG. 3, causes movement of the cam following element 62 up the camming ramp 69 and around the peripheral camming surface 71 of the element 54. Movement of the element 62 up onto the surface 71 causes the element 62 to pivot into engagement with stop surface 64 of element 52. Thereafter, this action causes the pivoting of the pivotable element 53 to its third condition as illustrated in the left-hand side of FIG. 5.

In the third condition of the pivotable element 53, the actuating surfaces 57 and 58 both actuate their associated conductive members 51 and 52 to pivot the same into contact with different terminals. More particularly, terminal G Low is connected to terminal A Hi by conductive member 51 while the terminal B Low is connected to the terminal C Hi by conductive member 52. This combination gives a ground signal on the circuit A and a power signal on the circuit C. As previously mentioned, if the switch 11 is turned to the off or first condition while the member 53 is in its third condition, power will be fed directly to the motor 17 from the source of power 23 and will be fed in such a manner that circuit C is the power circuit and circuit A is the ground circuit. This particular direction of feeding power will continue to run the motor 17 in the same direction as when the motor was supplied from the power supply 10.

As shown in FIG. 2 toward the end of each wipe cycle and each single rotation of the camming element 54, the power and ground signals are interchanged on the C and A circuits. This interchange action is effected when the peripheral cam surface 71 of the element 54 is terminated at a drop off 72. The drop off of the surface 71 allows pivotable element 53 to assume its second condition for the short space of time that it takes the cam track following element 62 of the element 53 to travel from the drop off 72 to and up the ramp 69. Once again, when the element 62 moves up the ramp 69, the pivotable element 53 will be pivoted to its third condition whereby a power signal is applied to the C circuit and a ground signal is applied to the A circuit. However, in the short space of travel from the drop off 72 to the camming ramp 69, the element is in its second condition and, as previously described, the G Low terminal is connected to C Low whereby a ground signal will be applied to the C circuit and the B Low terminal will be connected to the A Low terminal whereby a power signal will be applied to the A circuit. The interchange of signals during the wipe cycle will have no effect on the motor 17 when the switch 11 is in its on or second condition because the A and C circuits are disconnected from the motor.

A description will now be made of the operation of the system when the switch 11 is returned from the on or second condition to the off or first condition. As previously described, when the switch 11 is turned off with the camming element 53 in its third condition, power will be supplied to the motor 17 in the forward direction to continue rotation of the motor in the proper direction. The power is supplied on the circuit C and the return to ground by the circuit A. However, when the camming element 53 assumes its second condition, that is, when the cam following element 22 thereon drops off the drop off 72, the signals on circuits C and A will be interchanged and the direction of rotation of the motor 17 will be reversed. Reversal of motor rotation also changes the rotation of the camming element 54 so that it will rotate in a clockwise direction as viewed in FIG. 3. The reverse rotation of the camming element causes the pivotable element 53 to remain in its second condition while the cam following element 62 is moved along the cam track portion 68 until it engages the stop surface 67 at the end of that cam track portion. Engagement of the stop surface 67 causes the movement of the pivotable element 53 to its first condition whereby a ground signal is applied on both the C and A circuits. The ground signal on both circuits is applied across the motor 17 whereby the motor is dynamically braked and brought to a rest condition.

The return of the cam track following element 62 along the cam track portion 68 allows the wiper drive mechanism to return the windshield wiper system from a normal wipe cycle to a park position. The length of the cam track portion 68 may be varied depending on how far it is desired to return the wiper blades from the normal wipe cycle to a park or depressed park position. If it is not desired to return the wipers to a depressed park position, the cam track portion 68 may be reduced to only a short length with the stop surface 67 closely adjacent the area of the drop off 72 whereby a dynamic braking of the motor will take place almost immediately upon reversal of the wiper system.

The invention disclosed will have many modifications

What is claimed is:

1. In a windshield wiper system of the type having a drive mechanism operated by a wiper drive motor between a park position and a wipe cycle, the improvement comprising:

a power supply for energizing the wiper motor;

motor driven switching means for producing in an ordered sequence one of three electrical outputs which are capable of (1) driving the wiper motor in a forward direction, (2) driving the wiper motor in a reverse direction and (3) dynamically braking the wiper motor;

a switch and intreconnecting means for electrically interconnecting the wiper motor, said motor driven switching means and said power supply, said switch of said means being operable from a first condition wherein said motor driven switching means is producing the electrical outputs controlling the wiper motor and said power supply is disconnected from the wiper motor to a second condition wherein said motor driven switching means is not producing the electrical outputs controlling the wiper motor and said power supply is connected to the wiper motor;

whereby when said switch of said switch and interconnecting means is moved initially from its first condition to its second condition, said power supply is connected to the wiper motor to render the same operative to drive the wiper drive mechanism to move the wiper system from its park position into its wipe cycle, and whereby when said switch of said switch and interconnecting means is thereafter returned from its second condition to its first condition, said power supply is disconnected from the wiper motor and said motor driven switching means is connected thereto to supply said ordered sequence of electrical outputs thereto so that (1) the wiper motor is driven in the forward direction to complete the last wipe cycle, (2) upon completion of the last wipe cycle the wiper motor is reversed to move the wiper system to the park position and (3) upon achieving the park position the wiper motor is dynamically braked to bring the wiper system to the park position whereat the system awaits further operation thereof by movement of said switch of said switch and interconnecting means again to its second condition.

2. In a windshield wiper system the type having a drive mechanism operated by a wiper drive motor between a park position and a repeated wipe cycle, the improvement comprising:

a power supply for energizing the motor;

motor driven switching means for producing in an ordered sequence one of three electrical outputs, a first one of said electrical outputs driving the wiper motor in the forward direction, a second one of said outputs driving the wiper motor in a reverse direction and said third one of said outputs dynamically braking the wiper motor, said motor driven switching means (1) producing said first electrical output during a major portion of each wipe cycle, (2) producing said second electrical output for an interval near the end of each wipe cycle, and (3) producing said third electrical output when the wiper system is achieving or is in a park condition;

a switch and interconnecting means for electrically interconnecting the wiper motor, said motor driven switching means and said power supply, said switch of said switch and interconnecting means being operable from a first condition wherein said motor driven switching means is connected to and supplying its said ordered sequence of electrical outputs to the wiper motor and said power supply is disconnected from the wiper motor to a second condition wherein said motor driven switching means is not supplying said electrical output to the wiper motor and said power supply is connected to the wiper motor;

whereby when said switch of said switch and interconnecting means is moved initially from its first condition to its second condition, said power supply is connected to the wiper motor thereby to drive the wiper system from its park position into its repeated wipe cycle, and whereby when said switch of said switch and interconnecting means is thereafter returned from its second condition to its first condition, said power supply is disconnected from the wiper motor and said motor driven switching means is connected thereto to supply said ordered sequence of electrical outputs thereto in a manner that said first output drives the wiper motor in the forward direction to complete the last wipe cycle, the second output near the completion of the last wipe cycle reverses the wiper motor to move the wiper system to the park position and the third output as the wiper system is achieving the park position dynamically brakes the wiper motor to bring it to the park position whereat the wiper system awaits further operation thereof by movement of said switch of said switch and interconnecting means again to its second condition.

3. The windshield wiper system as defined in claim 2 wherein said motor driven switching means includes a portion of the drive mechanism of the windshield wiper system.

4. The windshield wiper system as defined in claim 2 wherein said motor driven switching means includes a power terminal, a ground terminal and two output terminals, and wherein said power and ground terminals are selectively interconnected with said output terminals by pivotable conductive members, the pivoting of the conductive members to different positions with respect to said terminals developing said ordered sequence of electrical outputs of said motor driven switching means.

5. The windshield wiper system as defined in claim 4 wherein said motor driven switching means includes: a cam element and a pivoting element, said pivoting element having both a portion thereof engaging said conductive members for pivoting the same to various positions and a portion thereof for engaging said cam element, said cam element (1) positioning said pivoting element in a first position at the termination of the wipe cycle of the wiper system, (2) positioning said pivotable element in a second position during the major portion of each wipe cycle, and (3) positioning said pivoting element in a third position for an interval near the end of each wipe cycle, each of the positions of said pivoting element producing for said motor driven switching means one of said three ordered sequence of electrical outputs.

References Cited

UNITED STATES PATENTS 2,959,968 11/1960 Gute _____ 318—466
3,253,206 5/1966 Romanowski _____ 318—466

ORIS L. RADER, Primary Examiner
A. G. COLLINS, Assistant Examiner

U.S. Cl. X.R.

318—266